United States Patent
Coppola (10) Patent No.: US 6,830,147 B2
(45) Date of Patent: Dec. 14, 2004

(54) DISC HOLDER ADAPTED FOR ATTACHMENT TO A BOTTLE

(76) Inventor: Francis Ford Coppola, 687 Carolina St., San Francisco, CA (US) 94107

( * ) Notice: Subject to any disclaimer, the term of this patent is extended or adjusted under 35 U.S.C. 154(b) by 81 days.

(21) Appl. No.: 09/989,630

(22) Filed: Nov. 20, 2001

(65) Prior Publication Data

US 2003/0094387 A1 May 22, 2003

(51) Int. Cl.⁷ .............................................. B65D 77/00
(52) U.S. Cl. ..................... 206/217; 206/232; 206/308.1
(58) Field of Search ............................... 206/217, 232, 206/308.1, 541, 542, 736, 312, 310

(56) References Cited

U.S. PATENT DOCUMENTS

| | | | |
|---|---|---|---|
| 2,374,092 A | 4/1945 | Glaser | 215/10 |
| 4,678,093 A | 7/1987 | Allen | 215/11 R |
| 4,761,379 A | 8/1988 | Williams et al. | 435/296 |
| 4,932,542 A | 6/1990 | Chen et al. | 215/1 R |
| 5,244,106 A | 9/1993 | Takacs | 215/100 R |
| 5,326,110 A | 7/1994 | Gould | 273/424 |
| 5,476,173 A | 12/1995 | Opresco | 206/309 |
| 5,590,768 A * | 1/1997 | Hilton et al. | 206/308.1 |
| 5,664,671 A * | 9/1997 | Nedblake, Jr. | 206/217 |
| 5,743,620 A | 4/1998 | Rojas et al. | 362/101 |
| 5,845,777 A | 12/1998 | Najmi | 206/459.1 |
| 5,887,712 A | 3/1999 | Jenkins et al. | 206/307.1 |
| 5,913,419 A | 6/1999 | Doodson | 206/308.1 |
| 5,953,288 A | 9/1999 | Chappell | 368/10 |
| 6,024,214 A * | 2/2000 | Cowan | 206/308.1 |
| 6,196,411 B1 * | 3/2001 | Nava et al. | 220/521 |
| 6,651,345 B1 * | 11/2003 | Gordon et al. | 206/232 |
| 2002/0063081 A1 * | 5/2002 | Gordon et al. | 206/736 |
| 2002/0139694 A1 * | 10/2002 | Gordon et al. | 206/232 |
| 2002/0175093 A1 * | 11/2002 | Gordon et al. | 206/232 |

* cited by examiner

Primary Examiner—David T. Fidei
(74) Attorney, Agent, or Firm—McDonnell, Boehnen Hulbert & Berghoff (57) ABSTRACT

A combination of a beverage container and a case for storing a compact disc, with the compact disc case being affixed to the beverage container. The combination also provides multiple options for accessing the compact disc from the case.

13 Claims, 10 Drawing Sheets

DISC HOLDER ADAPTED FOR ATTACHMENT TO A BOTTLE

FIELD OF THE INVENTION

The present invention relates to the field of packaging, specifically the packaging of beverages and compact discs.

BACKGROUND OF THE INVENTION

In the sale of consumer products, it is often desirable to design packaging that will promote the sale of multiple items simultaneously. Often the primary consumer product is packaged with a promotional consumer product in order to promote the sale of the primary product. Presently, there is no packaging that permits facile sale of the combination of a primary consumer product, like a beverage, with a promotional consumer product, like a compact disc.

SUMMARY OF THE INVENTION

The present invention provides the combination of a beverage container and a case for storing a compact disc with the compact disc case being affixed to the beverage container. The present invention also provides multiple mechanisms for accessing the compact disc stored in the case.

DETAILED DESCRIPTION OF THE PREFERRED EMBODIMENTS

One possible use of the combination beverage container and compact disc case of the present invention may be for the commercial sale of beverages. A beverage bottler may package his beverage in the beverage container of the present invention and package a promotional CD or DVD in the case of the present invention affixed to the beverage container. Conversely, the CD or DVD may be packaged with a promotional beverage. In either scenario, a consumer will be further enticed to purchase the beverage or CD or DVD because they will receive the promotional item along with the purchase. The combined packaging of the beverage and the CD or DVD is advantageous to the seller and has more consumer appeal than packaging the beverage and the CD or DVD separately.

Figure 1:
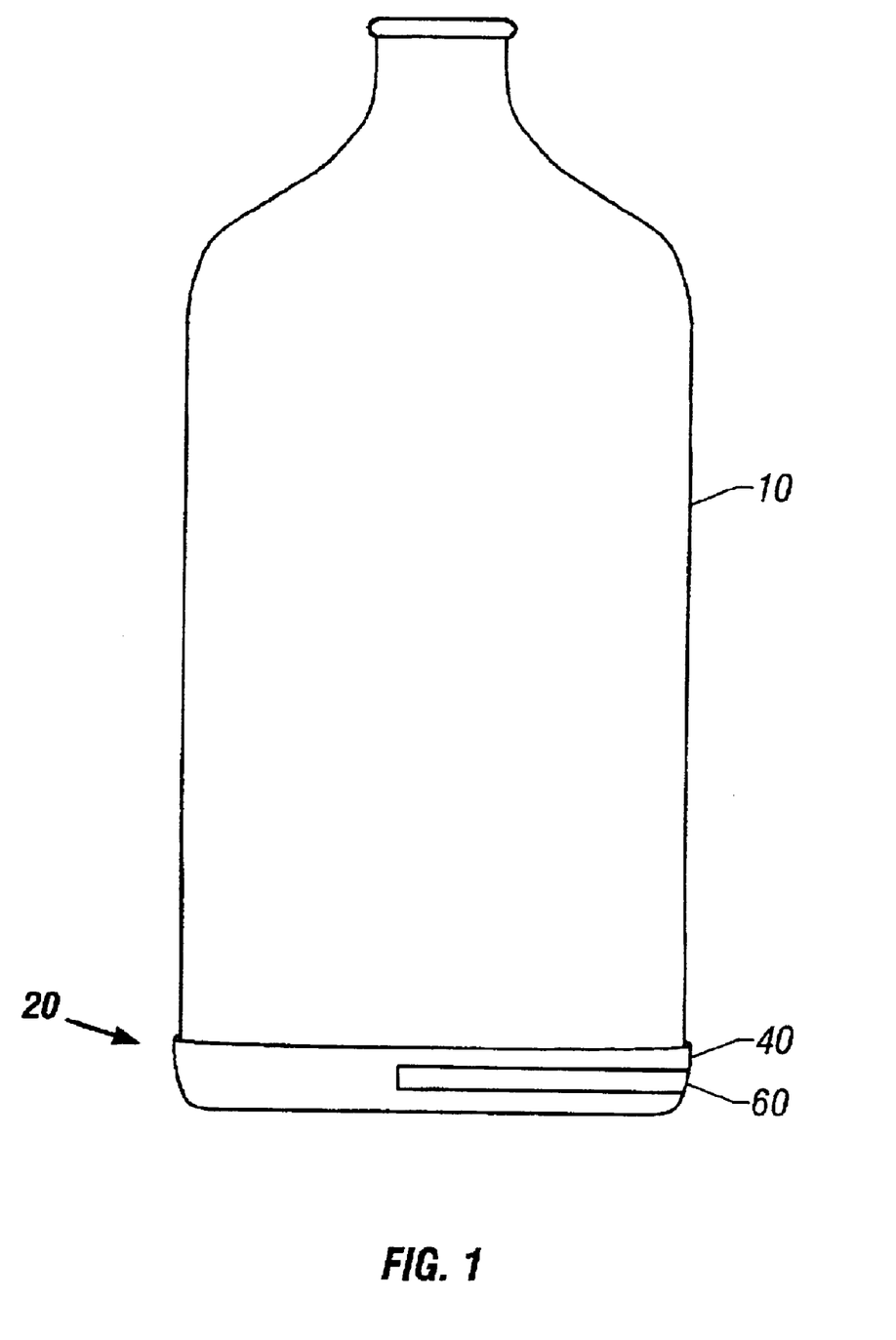
FIG. 1 is an illustration of a preferred embodiment of the present invention.

Turning now to the drawings, FIG. 1 shows a preferred embodiment of the present invention having a beverage container 10 in combination with a case 20 for holding a compact disc. The beverage container 10 used in the present invention may be composed of any one of a variety of materials, such as plastic, metal, or glass. The beverage container 10 has a base 12 that can range in diameter from two (2) to six (6) inches. Although the preferred embodiments of the present invention use a glass wine bottle or standard 2-liter plastic bottle (e.g., used in the packaging of soda pop) in combination with the case 20, the beverage container 10 need not be limited to those with a round base.

Likewise, the dimensions of the case 20 utilized in the present invention are dependent upon a number of factors, such as the size of the beverage container utilized and/or the size of the compact disc. However, the size of the beverage container 10 need not limit the size of case 20, nor must the size of the compact disc limit the size of the beverage container. For example, it is conceivable that the diameter of the disc and, therefore, of the case may be larger than the diameter of the beverage container. The present invention is not limited to a case for standard, round, five-inch compact discs but also includes cases for smaller compact discs and compact discs of different shapes (e.g., rectangular). The present invention may also be used with more than one compact disc. Furthermore, the term compact disc as used herein is not limited and includes any similar optically readable storage medium including, but not limited to, CDs, CD-Rs, CD-RWs, and DVDs. A case for storing a CD holding any type of information, such as music, digital images, video, or software may be utilized in the present invention.

The case 20 is comprised of a protective housing 40 and a tray 60. The protective housing has a top member 41 having a top surface 42 and a bottom surface 44. The top surface 42 and bottom surface 44 of the top member 41 are connected via an upstanding wall 46 about the perimeter of the housing 40. In some embodiments, the upstanding wall 46 may extend beyond the top surface 42 of the top member 41 of the housing 40. The top member 41 of the housing 40 is designed to attach the case to the beverage container 10 and to protect the compact disc on the top side. The case also has a bottom member 47 having a top surface 48 and a bottom surface 49. The bottom member 47 is designed to protect the compact disc from the bottom side. The protective housing 40 can be made of a variety of stiff, non-deformable material(s), but is preferably made of plastic.

The case according to the invention is adapted to be permanently or removably affixed to a beverage container. Preferably, the top member 41 of the protective housing 40 is affixed to the base 12 of the beverage container by the placement of an adhesive between the top surface 42 of the top member and the base 12 of the beverage container. Alternatively the housing 40 may be affixed to the beverage container 10 by the friction created between the upstanding wall 46 of the housing and the base 12 of the beverage container. The top surface 42 of the top member of the housing may be flat or, alternatively, may be conformed to the shape of the base 12 of the beverage container 10. Where permanent affixation of the case 20 to the beverage container 10 is desired, the top surface 42 is preferably conformed to the shape of the base of the beverage container.

Figure 2:
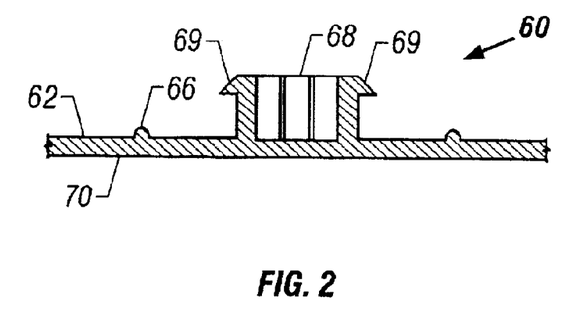
FIG. 2 is a cross sectional view of the tray.

The tray 60 of the present invention is designed to hold a compact disc within the protective housing 40 of the case 20. FIG. 2 shows a cross-sectional view of the upper surface 62 of the tray 60. The tray 60 has a central post 68 with four flexing catches 69 for holding the compact disc in place. Preferably, a circular rib 66 surrounds the central post 68 on the upper surface 62 of the tray 60. This rib 66 elevates the compact disc from the upper surface 62 of the tray 60 to ease the removal of the disc from the tray 60 by the user. To further assist the user in removal of the compact disc, surface depressions 64 may be designed in the upper surface 62 of the tray to allow the user to easily grip the edges of the compact disc with her fingers.

Figure 3:
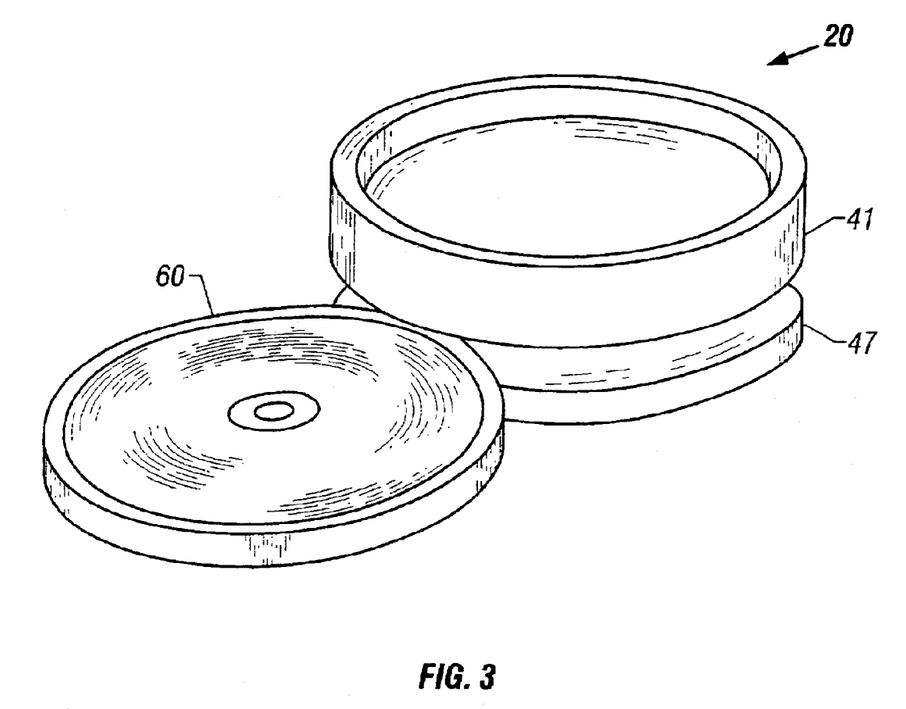
FIG. 3 is an illustration of the case of FIG. 1 where the tray is located within the housing.
Figure 4:
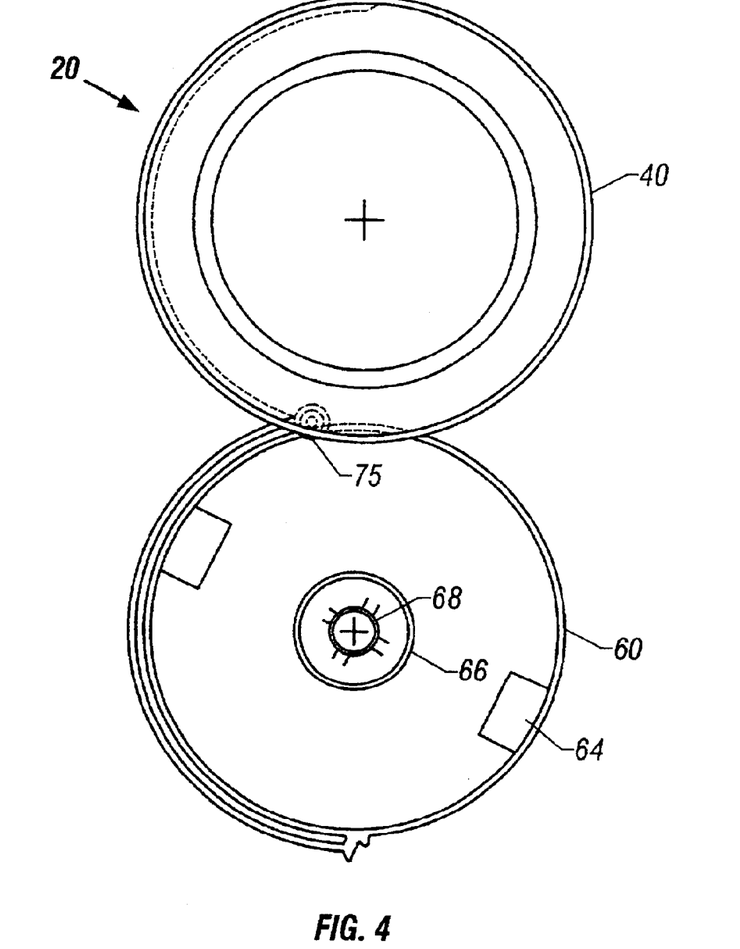
FIG. 4 is a perspective view of the case of FIG. 3 with the tray rotated in an open position, away from the housing.
Figure 5:
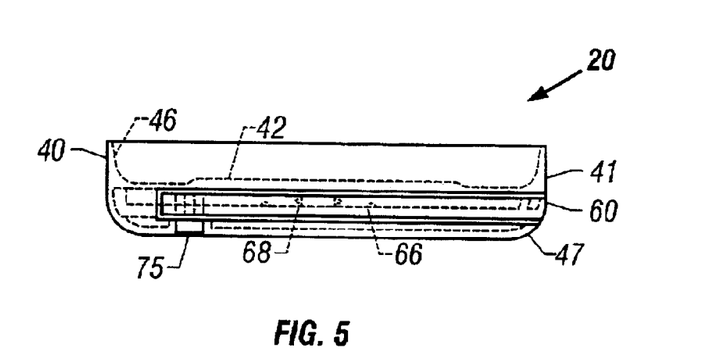
FIG. 5 is a perspective view of the case of FIG. 3 with the tray located within the housing.
Figure 6:
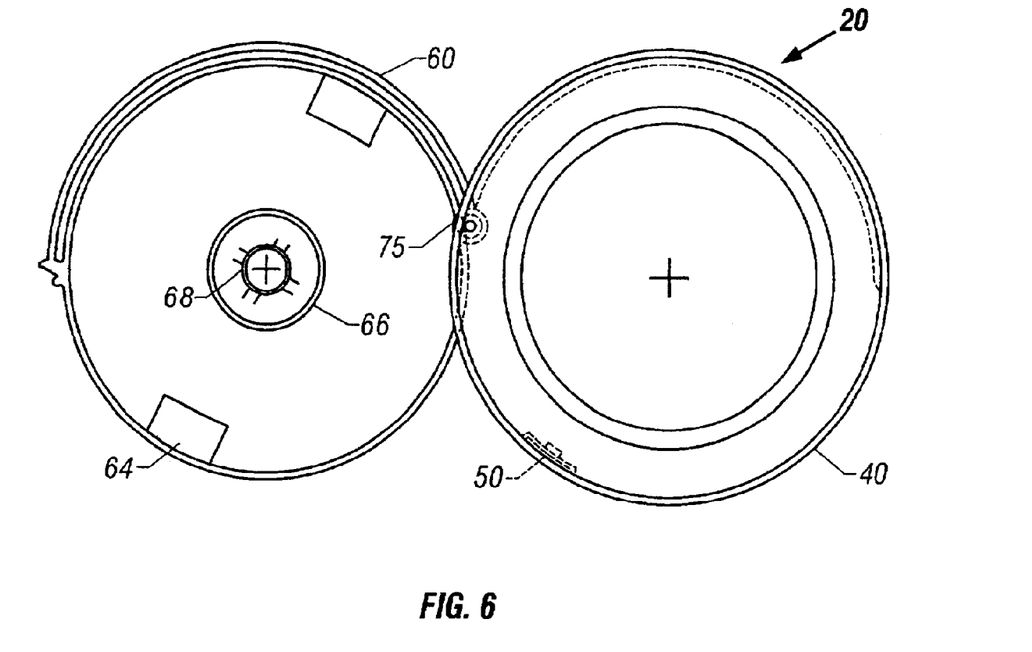
FIG. 6 is a perspective view of the case of FIG. 3, having an opening mechanism, with the tray rotated away from the housing.
Figure 7:
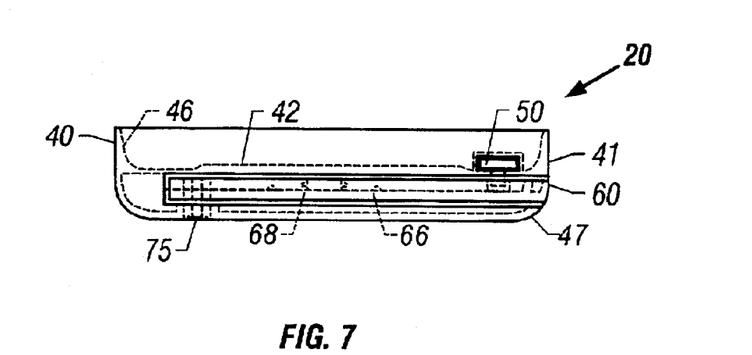
FIG. 7 is a perspective view of the case of FIG. 3, having an opening mechanism, with the tray located within the housing.
Figure 8:
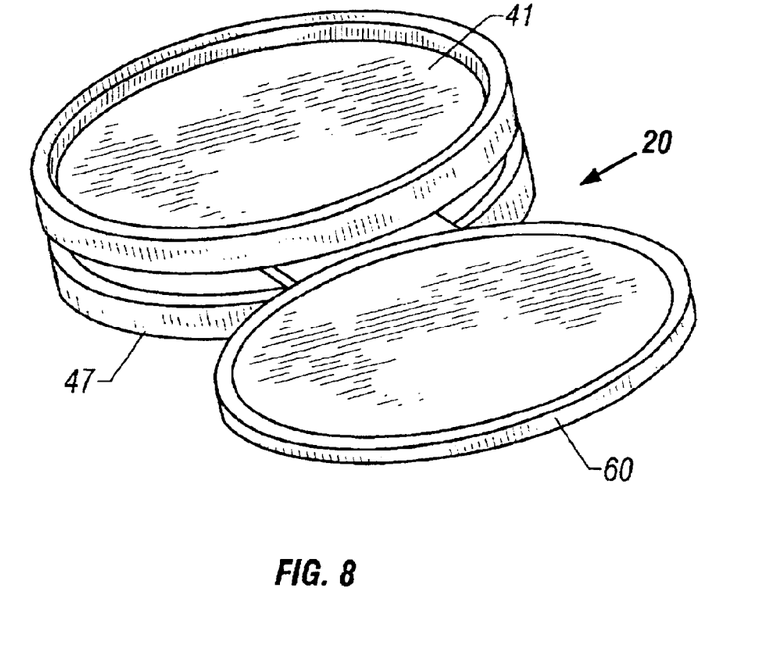
FIG. 8 is an illustration of the case of FIG. 1 where the tray is located within the housing and slides out from the housing when opened.
Figure 9:
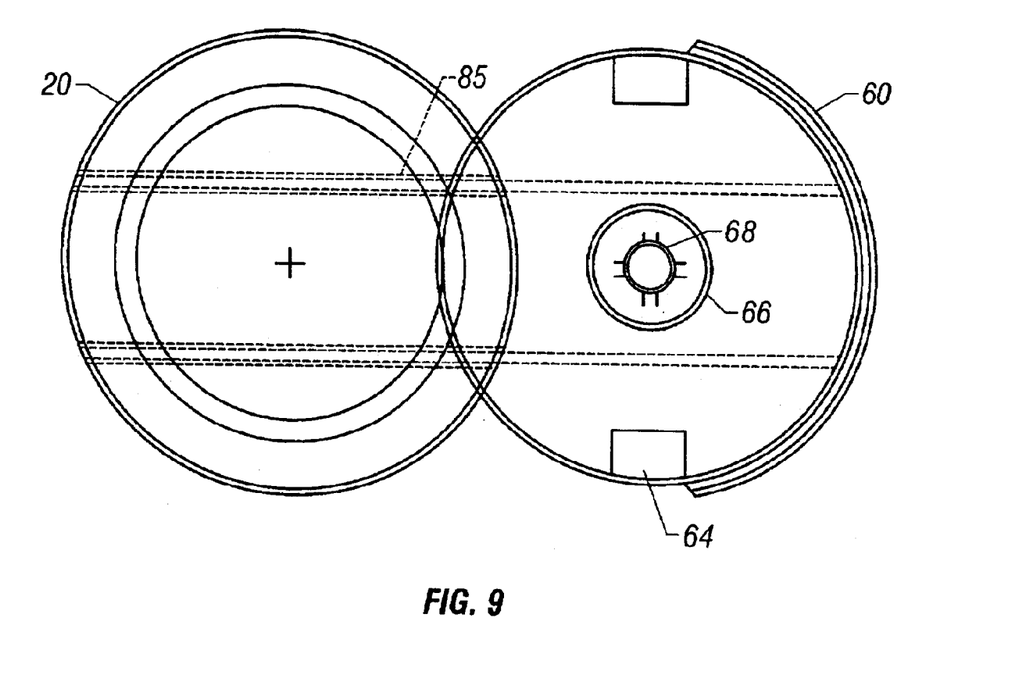
FIG. 9 is a perspective view of the case of FIG. 8 with the tray positioned away from the housing.
Figure 10:
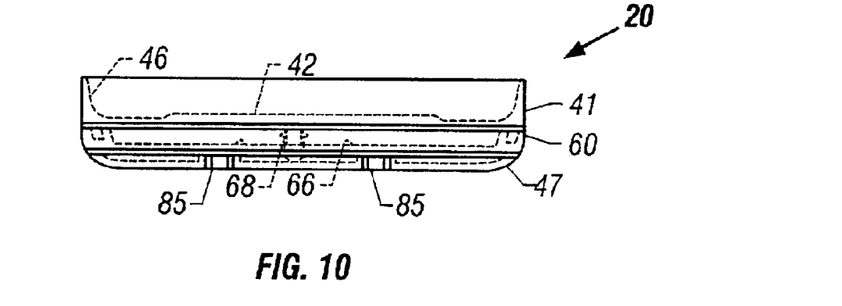
FIG. 10 is a perspective view of the case of FIG. 8 with the tray positioned within the housing.

In the preferred embodiments shown in FIGS. 3–13, the tray 60 is located within the housing 40 between the top member 41 and bottom member 47 of the housing 40. Preferably, the top member 41 and the bottom member 47 are permanently attached to each other along a portion of the upstanding wall 46 of the perimeter of the housing. The top member 41 and bottom 47 may be molded as separate pieces or as one integrated unit. In one preferred embodiment, shown in FIGS. 3–7, the tray 60 rotates about a pivot point 75 from a first position within the housing 40 to a second position outside the housing. The pivot point 75 connects the tray 60 to the housing 40 and rotates along an axis that is perpendicular to the plane of the tray 60. In the embodiment of FIGS. 3–5, the tray 60 rotates away from the housing when the tray is manually pulled open by the user. Alternatively, as shown in FIGS. 6–7, the tray 60 may rotate away from the housing when an opening mechanism 50 is triggered. Preferably, the opening mechanism utilized is a spring-loaded latch. However, one of skill in the art would recognize that a number of different types of opening mechanisms may be utilized in the present invention, such as a clasp, or a pressure sensitive latch.

Figure 11:
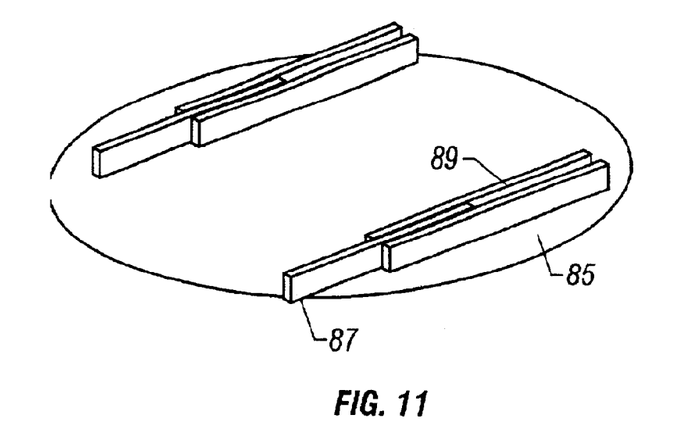
FIG. 11 is a detailed view of the guides of the case of FIG. 8.
Figure 12:
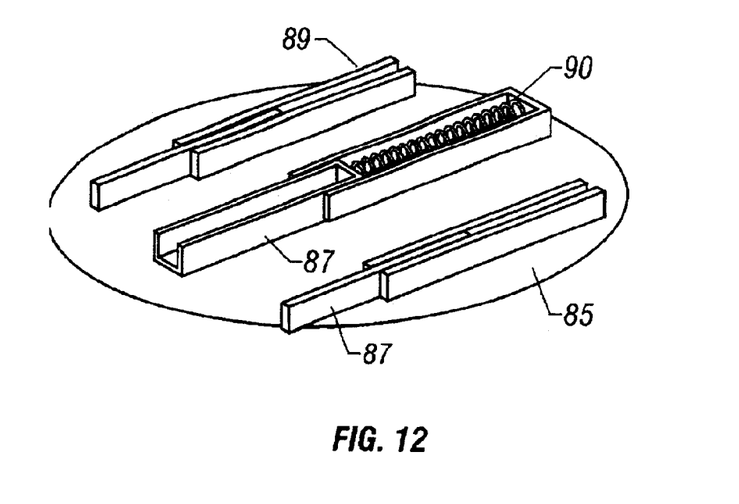
FIG. 12 is a detailed view of alternative guides of the case of FIG. 8.
Figure 13:
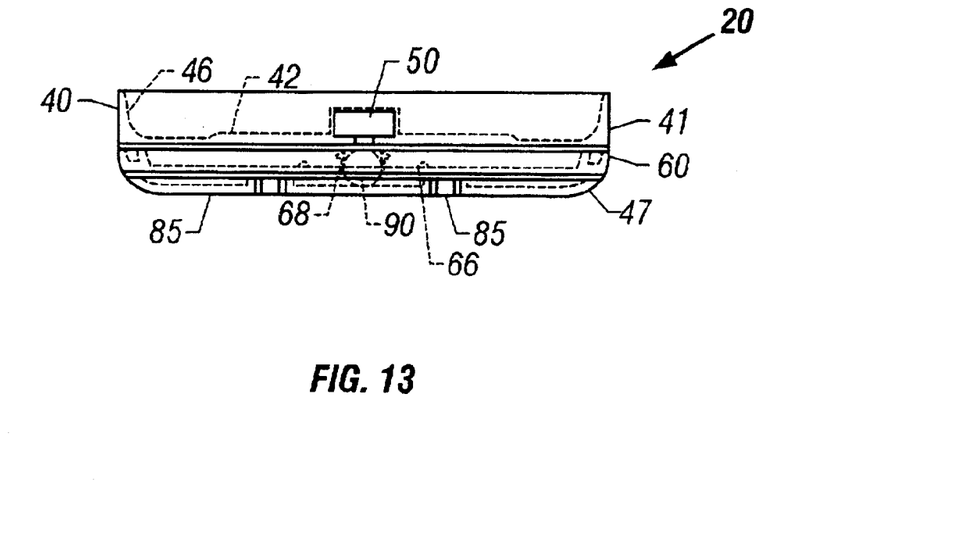
FIG. 13 is an illustration of the case of FIG. 8 having an opening mechanism.

In another preferred embodiment, shown in FIGS. 8–13, the tray 60 slides from a first position within the housing 40 to a second position away from the housing 40 along guides 85 located between the bottom member 47 of the housing and the tray 60. Examples of the guides 85 utilized in the present invention are shown in FIG. 11, showing a runner 87 located on the lower surface 70 of the tray sliding within a track 89 placed between the tray 60 and the bottom member 47 of the housing, and FIG. 12, showing the runner system of FIG. 11 with a spring 90 pushing against one of the runners 87. One of skill in the art would recognize that the guide examples shown in FIGS. 11 and 12 are just two of the many variations of guides 85 that may be used in the present invention to slide the tray 60 out from the housing 40. Furthermore, as shown in FIG. 13, an opening mechanism may be used in the present embodiment to initiate the sliding of the tray.

Figure 14:
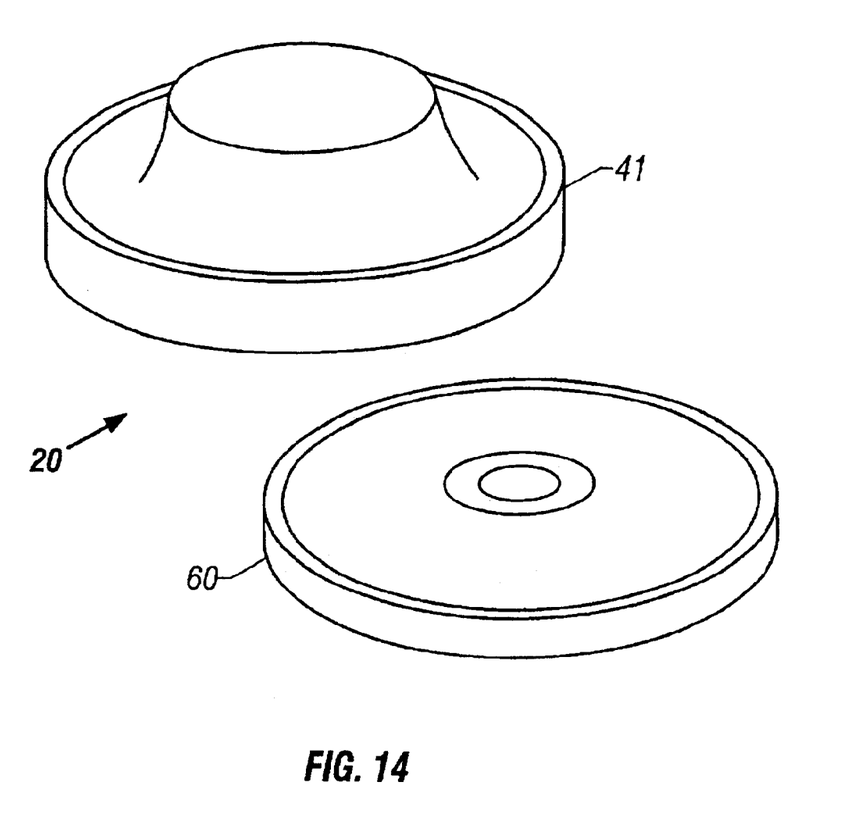
FIG. 14 is an illustration of the case of FIG. 1 where the tray is completely separated from the housing.
Figure 15:
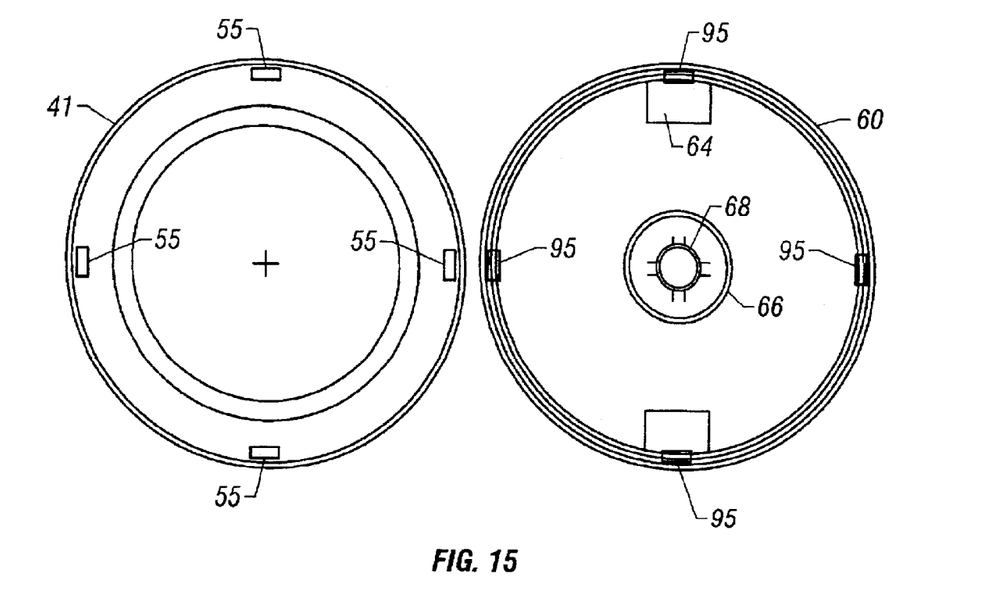
FIG. 15 is a perspective view of the case of FIG. 14 with the housing and the tray separated from one another.
Figure 16:
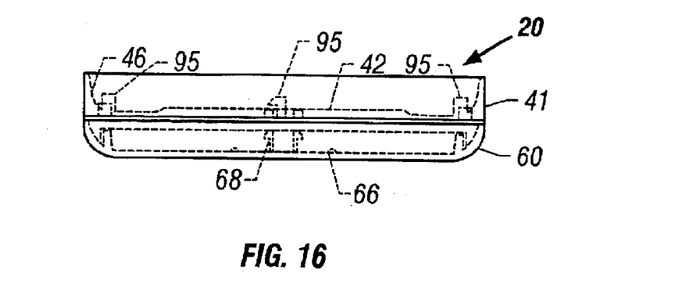
FIG. 16 is a perspective view of the case of FIG. 14 with the tray attached to the housing.
Figure 17:
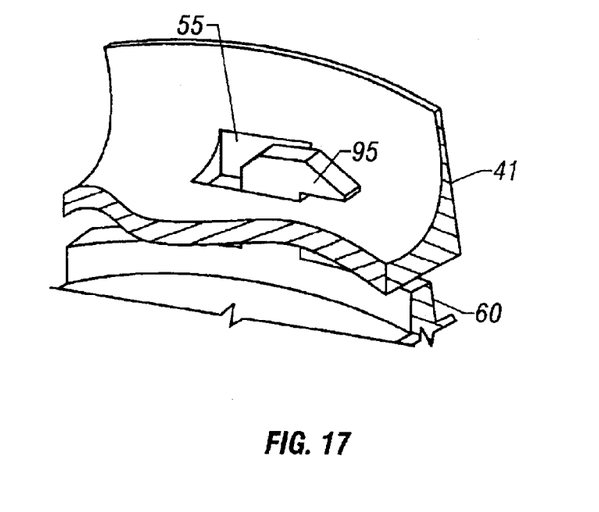
FIG. 17 is a detailed view of the catches for holding the tray to the housing.

In the preferred embodiments shown in FIGS. 14–20, the tray 60 is affixed to the bottom member 47 or integrated with the bottom member 47 to form one unit. The tray/bottom member is then attached to the top member 41 of the housing. In one preferred embodiment, the tray bottom member is completely separated from the top member 41 of the housing, as shown in FIG. 14. In this embodiment, the tray/bottom member may be removeably attached to the housing by friction or by using clasps that release when a force is exerted against the tray/bottom member. Alternatively, screw threading may be located about the perimeter of the tray/bottom member and the top member 41 of the housing to hold the tray into place. In still another alternative, shown in FIGS. 15–17, catches 95 formed along the perimeter of the upper surface 62 of the tray may be engaged within catch holes 55 located along the perimeter of the bottom surface 44 of the top member 41 of the housing. When the tray 60 is twisted, the catches 95 fall through the catch holes 55 and release the tray 60 from the housing 40.

Figure 18:
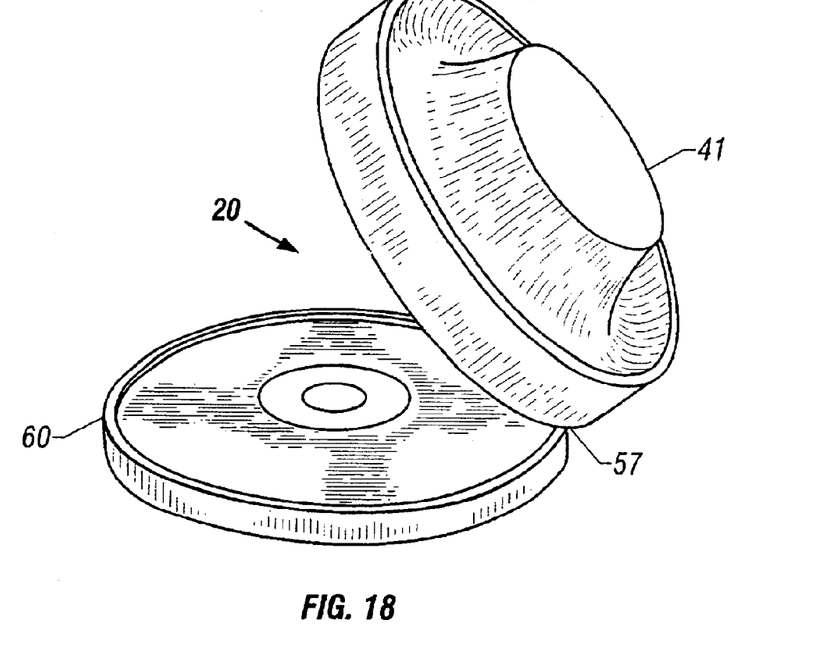
FIG. 18 is an illustration of the case of FIG. 1 where the tray is hinged to the housing.
Figure 19:
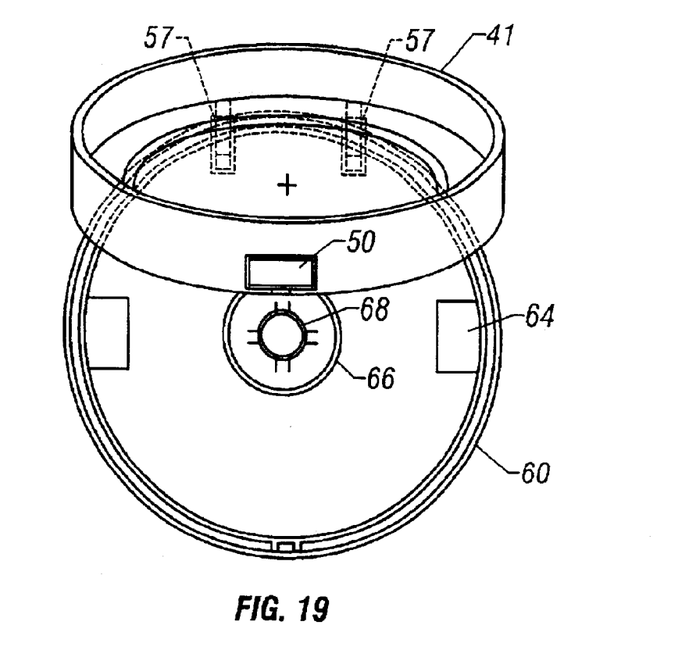
FIG. 19 is a perspective view of the case of FIG. 18 with the hinges opened.
Figure 20:
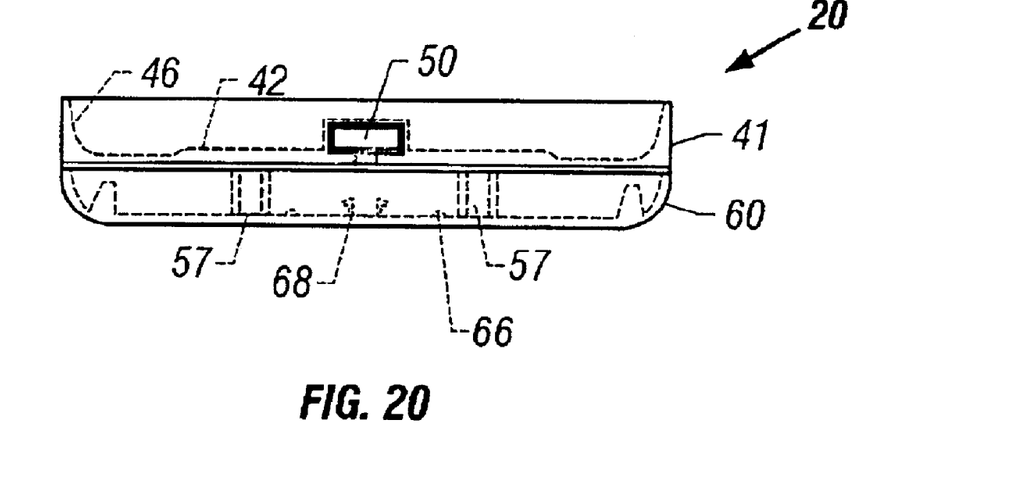
FIG. 20 is a perspective view of the case of FIG. 18 with the hinge closed.

In another preferred embodiment, shown in FIGS. 18–20, the tray/bottom member 60 is permanently attached to the top member 41 of the housing through a hinge, a pivot point, or guides. The tray 60 may be held in a closed position against the top member 41 by the weight of the beverage container 10, by clasps that release when force is exerted against the tray 60, or by an opening mechanism 50.

Figure 21:
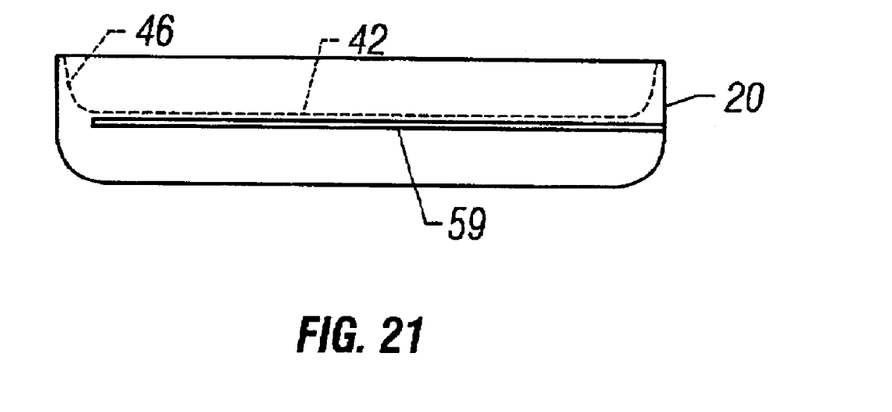
FIG. 21 is an illustration of the case of FIG. 1 where the housing contains a slot for the compact disc.

In another preferred embodiment, shown in FIG. 21, the case 20 consists of only the top member 41, with no tray 60 or bottom member 47. The top member contains a slot 59 which is parallel with the top surface of the top member and is the same size or slightly smaller in diameter than the compact disc. The compact disc is held within this slot by friction, a clasp or latch. Preferably, depressions are made in the upstanding wall 46 at the slot in order to allow the user to grip the compact disc and remove it from the housing.

It should be understood that a wide range of changes and modifications can be made to the embodiments of the combination beverage container and compact disc case described above. For instance, the size and shape of the beverage container, the size and shape of the case, and/or the mechanism used to open the tray holding the compact disc may be different than the exemplary embodiments described above, depending on consumer and manufacturing preferences. It is therefore intended that the foregoing description illustrates rather than limits this invention, and that it is the following claims, including all equivalents, which define the invention.

What is claimed is:

1. The combination of beverage container and compact disc case, the combination comprising:

a beverage container having a base; and a case the comprising a protective housing and a tray containing a central post to hold at least one compact disc;

the housing having a top member and a bottom member; and the tray being moveable and having a first position within the housing between the top member and the bottom member of the housing and a second position away from the housing, the case being affixed to the base of the beverage container.

2. The combination of claim 1 wherein the tray moves from the first position to the second position by rotating about a pivot point connecting the tray to the housing.

3. The combination of claim 2 having an opening mechanism, which upon activation, allows or causes the tray to move from the first position to the second position.

4. The combination of claim 1 wherein the tray moves from the first position to the second position by sliding along a set of guides positioned between the tray and the housing.

5. The combination of claim 4, having an opening mechanism, which upon activation, allows or causes the tray to move from the first position to the second position.

6. The combination of beverage container and compact disc case, the combination comprising:
   a beverage container having a base; and
   a case comprising a protective housing and a tray containing the central post to hold at least one compact disc;
   the housing having a top member and a bottom member; and
   the tray being affixed to or integrated into the bottom member and being removeably attached to the top member of the housing, the case being affixed to the base of the beverage container.

7. The combination of beverage container and compact disc cases, the combination comprising:
   a beverage container having a base; and
   a case wherein the case comprises a protective housing and a tray containing the central post to hold at least one compact disc;
   the housing having a top member and a bottom member; and
   the tray being affixed to or integrated into the bottom member an being permanently attached to the top member of said housing, the case being affixed to the base of the beverage container.

8. The combination of claim 1 wherein the top member of the housing is conformed to the base of the beverage container, the top surface of the housing mating with the base of the beverage container.

9. The combination of beverage container and compact disc case, the combination comprising;
   a beverage container having a base; and
   a case wherein the case having a top member with an upstanding wall about its perimeter, and wherein the wall mates with and is affixed to the base of the beverage container.

10. The combination of claim 1 wherein the beverage container is a glass wine bottle.

11. A combination of beverage container and compact disc case, the combination comprising:
    a beverage container having a base; and
    a case, affixed to the base of the beverage container, comprising a protective housing having a top member and a tray removeably attached to the top member of the protective housing.

12. The combination of claim 11 wherein the tray is completely separated from the protective housing when the case is opened.

13. The combination of beverage container and compact disc case, the combination comprising:
    a beverage container having a base; and
    a case, affixed to the base of the beverage container, comprising a protective housing having a top member and a tray removeably attached to the top member of the protective housing
    wherein the tray is hinged to the top member of the protective housing.

* * * * *